United States Patent
Nishida et al.

(10) Patent No.: US 10,453,276 B2
(45) Date of Patent: Oct. 22, 2019

(54) REPORTING DEVICE

(71) Applicant: HITACHI, LTD., Chiyoda-ku, Tokyo (JP)

(72) Inventors: Takehisa Nishida, Tokyo (JP); Mariko Okude, Tokyo (JP); Masayoshi Ishikawa, Tokyo (JP); Kazuo Muto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 75 days.

(21) Appl. No.: 15/462,668

(22) Filed: Mar. 17, 2017

(65) Prior Publication Data

US 2017/0278321 A1    Sep. 28, 2017

(30) Foreign Application Priority Data

Mar. 25, 2016  (JP) ................. 2016-061080

(51) Int. Cl.
| | |
|---|---|
| G07C 5/00 | (2006.01) |
| G05D 1/00 | (2006.01) |
| G08G 1/16 | (2006.01) |
| G07C 5/08 | (2006.01) |

(52) U.S. Cl.
CPC ......... *G07C 5/0808* (2013.01); *G05D 1/0088* (2013.01); *G07C 5/008* (2013.01); *G08G 1/164* (2013.01); *G08G 1/166* (2013.01)

(58) Field of Classification Search
CPC ..... G07C 5/0808; G07C 5/008; G05D 1/0088
See application file for complete search history.

(56) References Cited

U.S. PATENT DOCUMENTS

| | | |
|---|---|---|
| 2006/0030984 A1 | 2/2006 | Kamiya |
| 2007/0250268 A1 | 10/2007 | Matsui |
| 2013/0147955 A1 | 6/2013 | Oosugi |
| 2016/0027305 A1 | 1/2016 | Inaba et al. |

FOREIGN PATENT DOCUMENTS

JP    2010-230419 A    10/2010

OTHER PUBLICATIONS

Extended European Search Report dated Oct. 9, 2017 for related European Application No. 17161253.4.

*Primary Examiner* — Yonel Beaulieu
(74) *Attorney, Agent, or Firm* — Miles & Stockbridge PC

(57) ABSTRACT

A reporting device that is connected to at least one vehicle, which is controlled based on a result of recognition by an outside recognizer, via a network provides the vehicle with information on a possibility of a failure in outside recognition on the basis of a condition under which a failure in outside recognition has occurred previously. Preliminarily, if a failure such as non-detection or erroneous detection occurs due to an outside recognizer of a connected car, the abnormality is stored while being linked with an external traveling environment such as the position of the vehicle or a weather.

12 Claims, 9 Drawing Sheets

REPORTING DEVICE

CLAIM OF PRIORITY

The present application claims priority from Japanese Patent application serial No. 2016-61080, filed on Mar. 25, 2016, the content of which is hereby incorporated by reference into this application.

FIELD OF THE INVENTION

The present invention relates to a reporting device and reporting method that detect an abnormality in an outside recognition device of a connected car which includes a function of autonomous drive or drive assist.

BACKGROUND OF THE INVENTION

A technology described in Japanese Patent Application Laid-Open No. 2010-230419 (Patent Document 1) is available for provision of attention attracting information on a danger arising place in a connected car. The Patent Document 1 describes that when an own vehicle is about to enter an intersection, to which roads with any of which abrupt brake attention attracting information is associated lead, along any of the roads, the abrupt brake attention attracting information associated with the road (link) or second abrupt brake attention attracting information is used as a flag to read and output an attention attracting message associated with the road.

CITATION LIST

Patent Document 1: Japanese Patent Application Laid-Open No. 2010-230419 According to Patent Document 1, abrupt brake occurring frequently on a specific road is attracted their attention. However, the circumstances of a connected car including a function of autonomous drive or drive assist (unless otherwise noted, what is referred to as a connected car is a vehicle including a function of autonomous drive or drive assist, and a driver can intervene in autonomous drive) are not taken into account.

Namely, a factor of abrupt brake may depend on a behavior of other vehicle or depend on precision in outside recognition. The factor of abrupt brake cannot be clearly deduced from information on a mere occurrence frequency of abrupt brake. The information is not decisive enough to properly control a vehicle on the basis of a result of recognition by an outside recognizer.

An object of the present invention is to provide appropriate information for a vehicle which is controlled based on a result of recognition by an outside recognizer.

SUMMARY OF THE INVENTION

The present invention resides in that a reporting device to be connected to a vehicle, which is controlled based on a result of recognition by an outside recognizer, via a network provides the vehicle with information on a possibility of a failure in outside recognition on the basis of a condition under which a failure in outside recognition has occurred previously.

According to the present invention, appropriate information can be provided for a vehicle which is controlled based on a result of recognition by an outside recognizer.

DETAILED DESCRIPTION OF THE INVENTION

Figure 1:
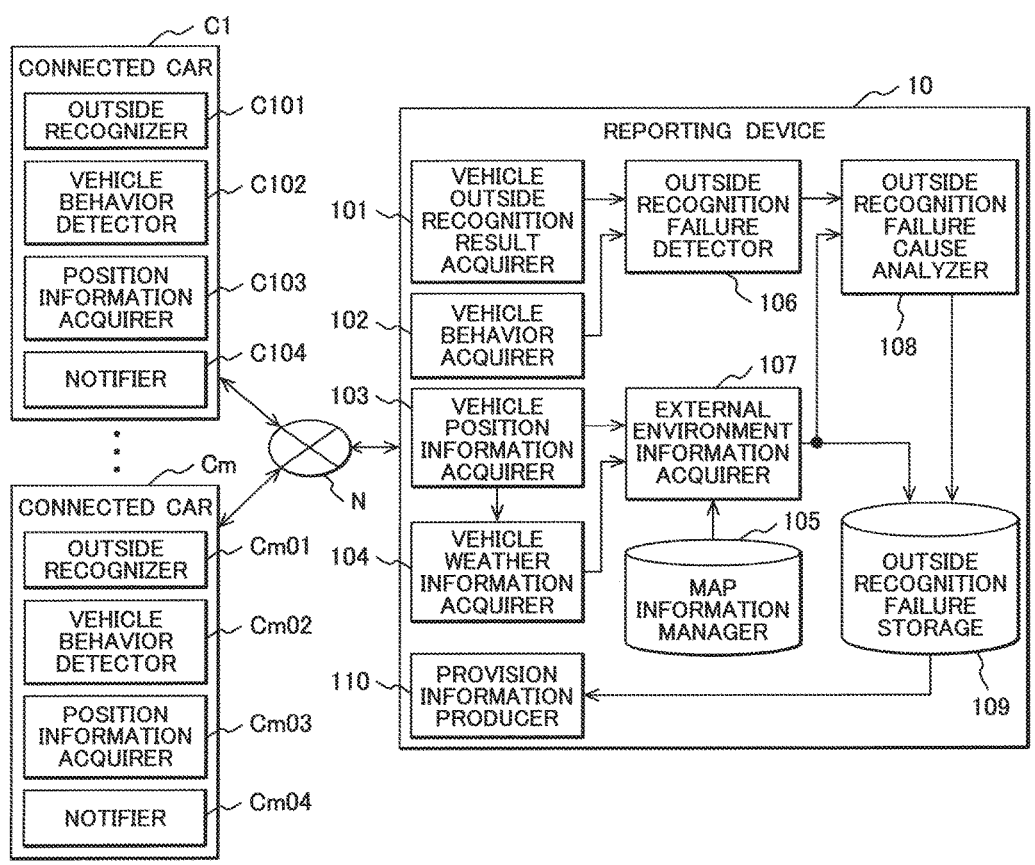
FIG. 1 is a diagram showing a configuration of a reporting device in accordance with an embodiment 1 of the present invention.

Referring to the drawings, embodiments will be described below.

Embodiment 1

FIG. 1 is a diagram showing a configuration of a reporting device 10 in accordance with an embodiment. m connected cars are connected to the reporting device 10 via a network N.

Each of the connected cars (C1 to Cm) includes at least an outside recognizer (any one of C101 to Cm01), a vehicle behavior detector (any one of C102 to Cm02), and a position information detector (any of C103 to Cm03), and transmits detected information to the reporting device 10 via the network. Furthermore, each of the connected cars includes a notifier (any one of C104 to Cm04), and thus includes a function that notifies information provided by the reporting device 10.

The reporting device 10 includes a vehicle outside recognition result acquirer 101, a vehicle behavior acquirer 102, and a vehicle position information acquirer 103. These acquirers are intended to acquire a result of recognition by the outside recognizer of a connected car, a vehicle behavior detected by the vehicle behavior detector, and position information on a vehicle acquired by the position information acquirer respectively. A result of recognition by the outside recognizer contains, if necessary, in addition to a relative distance or relative speed of an own vehicle (the connected car) from a peripheral object, information signifying whether a vehicle is on the same lane as the own vehicle, and a camera image or distance image that is a sensor value provided by the outside recognizer of the connected car.

A vehicle weather information acquirer 104 acquires weather information concerning a vehicle position on the basis of position information of a connected car acquired by the vehicle position information acquirer 103.

A map information manager 105 stores map information.

An outside recognition failure detector 106 detects a failure in outside recognition of a vehicle on the basis of a result of recognition by the outside recognizer of a connected car, which is acquired by the vehicle outside recognition result acquirer 101, and a vehicle behavior of the connected car, which is acquired by the vehicle behavior acquirer, according to a method to be described later.

An external environment information acquirer 107 maps the position of a connected car into a map on the basis of the position information on the connected car, which is acquired by the vehicle position information acquirer 103, and map information, which is stored by the map information manager 105, and acquires as external environment information the position information together with weather information concerning the position of the vehicle acquired by the vehicle weather information acquirer 104.

An outside recognition failure cause analyzer 108 extracts information, which is highly related to a failure in outside recognition of a connected car which is detected by the outside recognition failure detector 106, from external environment information on the connected car acquired by the external environment information acquirer 107, and links the failure with the extracted information.

An outside recognition failure storage 109 stores an external environment of a vehicle which is linked with a failure in outside recognition of a connected car by the outside recognition failure cause analyzer. In addition, when external environment information acquired by the external environment information acquirer 107 is inputted, the outside recognition failure storage checks a possibility of a failure in outside recognition in terms of a condition of the same external environment stored previously.

A provision information producer 110 produces check information on a possibility of a failure in outside recognition of a vehicle which is checked in response to input of external environment information of a connected car, which is acquired by the external environment information acquirer 107, to the outside recognition failure storage 109.

Next, a description will be made of a method of detecting a failure in outside recognition by the outside recognition failure detector 106. A failure in outside recognition includes non-detection, which signifies that an object (for example, a preceding vehicle traveling on the same lane) cannot be detected, and erroneous detection which signifies that an object is identified though it does not exist.

Figure 2A:
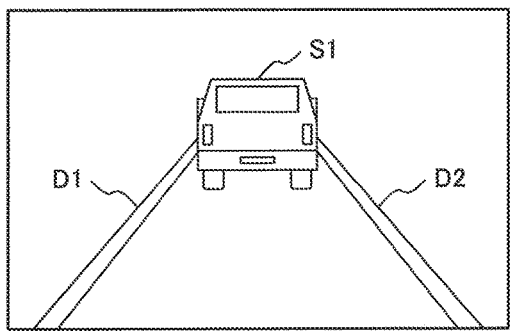
FIGS. 2A to 2D are diagrams showing an example of detecting non-detection on the basis of a change in a relative distance from an object in the embodiment 1 of the present invention.

FIGS. 2A to 2D show an example of detecting non-detection on the basis of a change in a relative distance from an object. If the relative distance of an own vehicle from an object suddenly changes, the object may be possibly lost sight of. FIG. 2A shows a state in which an object S1 that is a preceding vehicle traveling on the same lane D1-D2 as an own vehicle is correctly identified. At this time, the relative distance of the own vehicle from the object is, for example, 30 m.

Figure 2B:
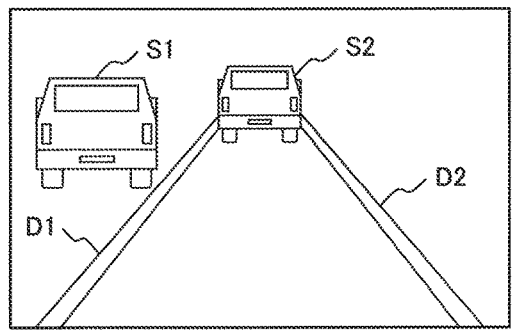

Assume that, as shown in FIG. 2B, the preceding vehicle S1 changes lanes or turns to the right or left and a preceding vehicle traveling on the same lane D1-D2 becomes a vehicle S2 traveling farther ahead. The relative distance of the own vehicle from the object is suddenly changed to, for example, 60 m. However, outside recognition is not a failure.

Figure 2C:
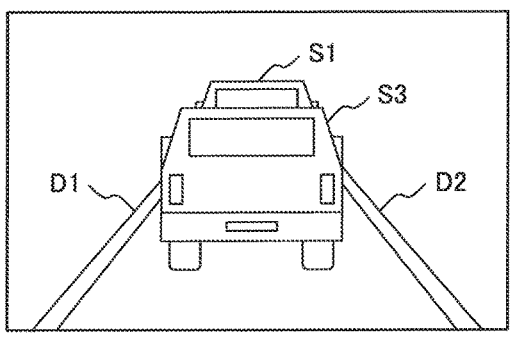

Likewise, assuming that, as shown in FIG. 2C, another vehicle S3 enters the same lane D1-D2 between the preceding vehicle S1 and own vehicle, the relative distance of the own vehicle from the object S3 suddenly changes to, for example, 15 m. However, outside recognition is not a failure.

Figure 2D:
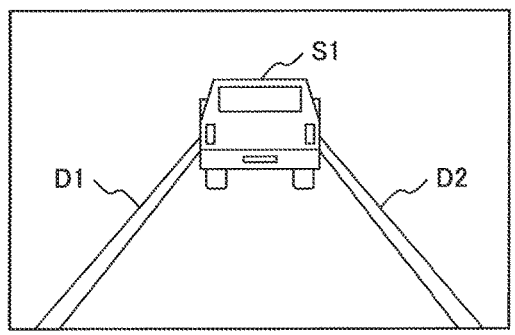

In contrast, when an object neither changes lanes nor turns to the right or left or any other vehicle does not interrupt in the state shown in FIG. 2A, if the relative distance of the own vehicle from an object becomes 60 m in the state shown in FIG. 2D or if absence of an object is determined, outside recognition is determined to have failed.

Now, FIGS. 2A to 2D explicitly show a preceding vehicle and lane. As far as the method of detecting non-detection on the basis of a change in a relative distance from an object is concerned, any device that can find the relative distance of the own vehicle from the object, such as, a camera or a laser sensor can be adopted as an outside recognition device.

Figure 3:
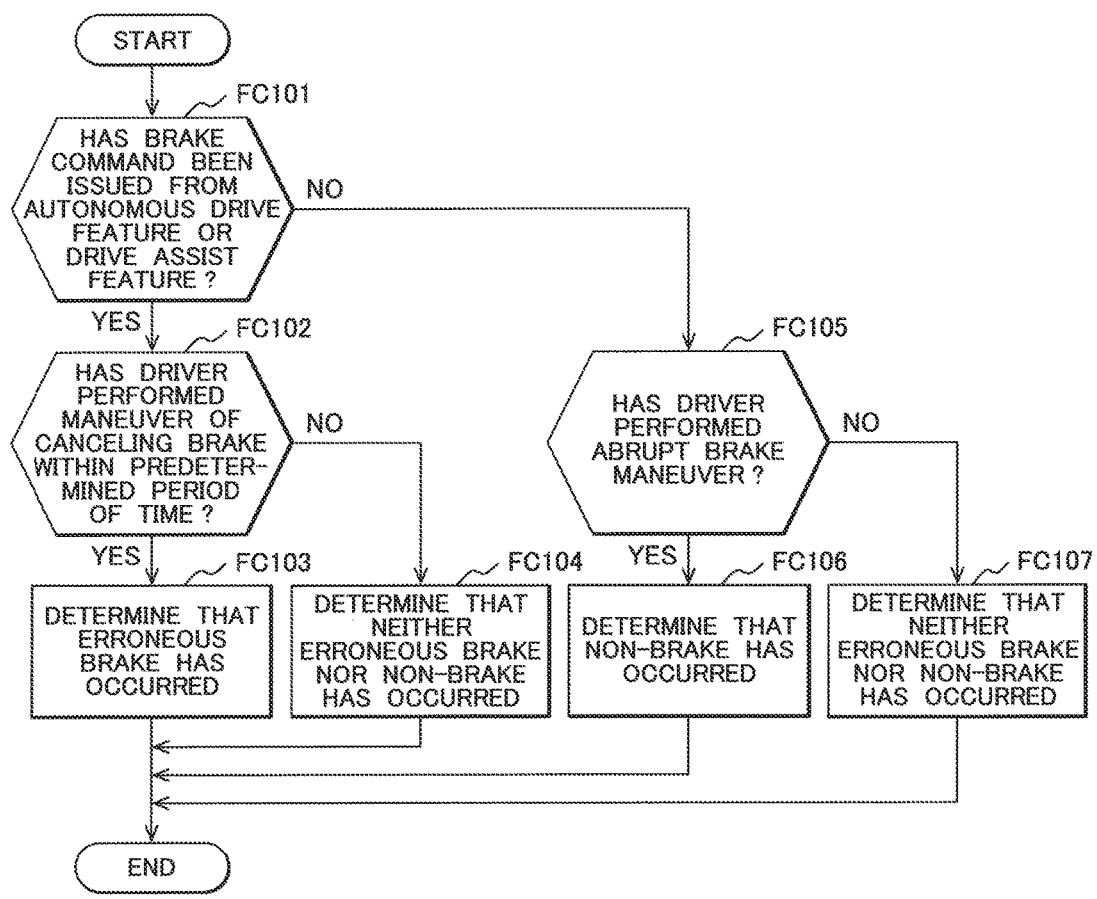
FIG. 3 is a flowchart describing a case where non-detection or erroneous detection is determined based on a combination of brake information, which is provided by an autonomous drive or a drive assist function, and maneuver information on a driver according to the embodiment 1 of the present invention.

Non-detection or erroneous detection can be inferred from brake information, which is provided by an autonomous drive or a drive assist function, and maneuver information on a driver. FIG. 3 is a flowchart describing a case where non-detection or erroneous detection is checked based on a combination of brake information, which is provided by the autonomous drive or drive assist function, and maneuver information on a driver.

At FC101, a brake command is checked to see if the command has been issued from an autonomous drive function or a drive assist function. If the brake command has been issued, processing proceeds to FC102.

At FC102, a maneuver of canceling brake is checked to see if the maneuver has been performed by a driver within a predetermined period of time since the issuance of the brake command from the autonomous drive function or drive assist function. If the maneuver has been performed, it is determined at FC103 that erroneous brake has occurred. If the maneuver has not been performed, it is determined at FC104 that neither erroneous brake nor non-brake has occurred. Herein, what is referred to as the driver's maneuver of canceling brake is a driver's action of depressing an accelerator pedal or the like.

If it is determined at FC101 that the brake command has not been issued from the autonomous drive function or drive assist function, an abrupt brake maneuver is checked at FC105 to see if the maneuver has been performed by the driver. If the maneuver has been performed, it is determined at FC106 that non-brake has occurred. If the maneuver has not been performed, it is determined that neither erroneous brake nor non-brake has occurred.

The foregoing method makes it possible to identify a difference between a brake command, which is issued from the autonomous drive function or drive assist function, and a driver's brake maneuver. Therefore, erroneous brake or non-brake can be detected.

Figure 4:
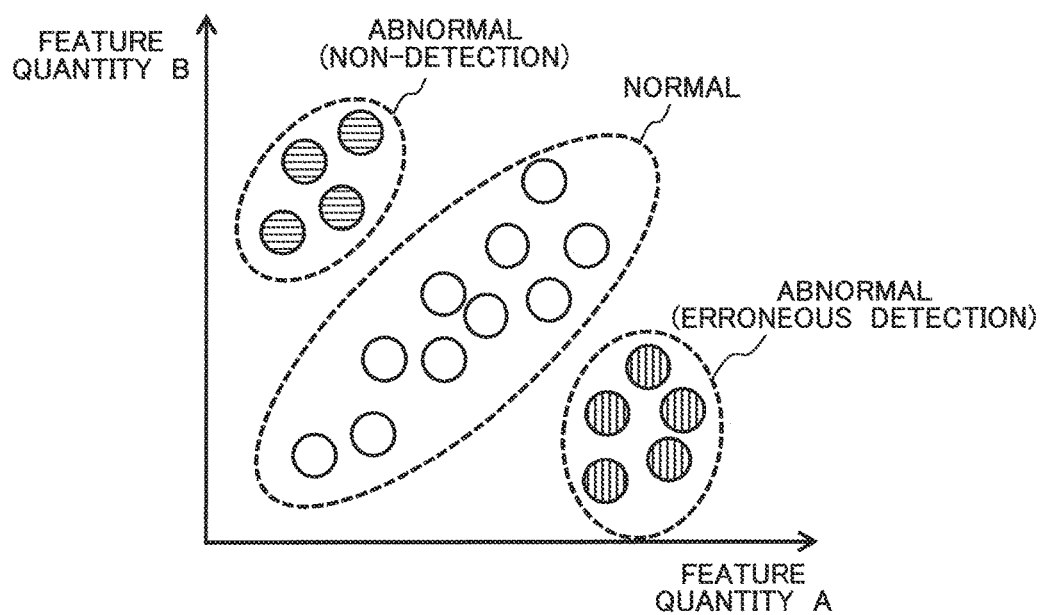
FIG. 4 is a diagram showing a correlation between feature quantities extracted from a result of outside recognition and a vehicle behavior according to the embodiment 1 of the present invention.

Furthermore, data items of previous successes and failures in outside recognition may be classified and learned, and non-detection or erroneous detection may be inferred from the previous learning data items. FIG. 4 is a diagram showing a correlation between a feature quantity A and a feature quantity B which are extracted from a result of outside recognition and a vehicle behavior respectively. As illustrated, when there are feature quantities based on which a case where outside recognition proves to be normal can be successfully separated from a case where outside recognition proves to be abnormal, current non-detection or erroneous detection can be inferred by classifying current feature quantities into any of normal, abnormal (non-detection), and abnormal (erroneous detection) groups.

Next, the external environment information acquirer 107 will be detailed below.

Information acquired by the vehicle position information acquirer 103 contains at least information on latitude and longitude of a vehicle. The information is linked with map information stored in the map information manager 105. Accordingly, for example, the fact that the vehicle is traveling through a tunnel or traveling in an indoor parking lot can be learned. The vehicle weather information acquirer 104 acquires weather information on an area covering the latitude and longitude of the vehicle. The weather information contains at least ordinary weather information such as fine, rain, or snow. The external environment information acquirer 107 acquires, as mentioned above, the position information on the vehicle and the weather information as external environment information. When the vehicle position information acquirer 103 can acquire information such as an altitude or a traveling direction, non-detection or erroneous detection dependent on the altitude or traveling direction can be extracted.

Next, an example of the outside recognition failure cause analyzer 108 will be presented below. A failure in outside recognition occurs when an external environment is different from an ordinary one. The outside recognition failure cause analyzer 108 extracts, in addition to position information, an environment, which is different from an ordinary one, from the external environment of a vehicle acquired by the external environment information acquirer 107. For example, a case where the vehicle is traveling through a tunnel, in a torrential rain, or in the nighttime is cited. These circumstances are linked with a failure in outside recognition. Accordingly, the external environment that is thought to cause a failure in outside recognition is identified. If non-detection or erroneous detection occurs in an environment that is thought to be ordinary, the environment different from the ordinary one is not extracted from the external environment but the environment thought to be ordinary is linked with a failure in outside recognition.

Figure 5:
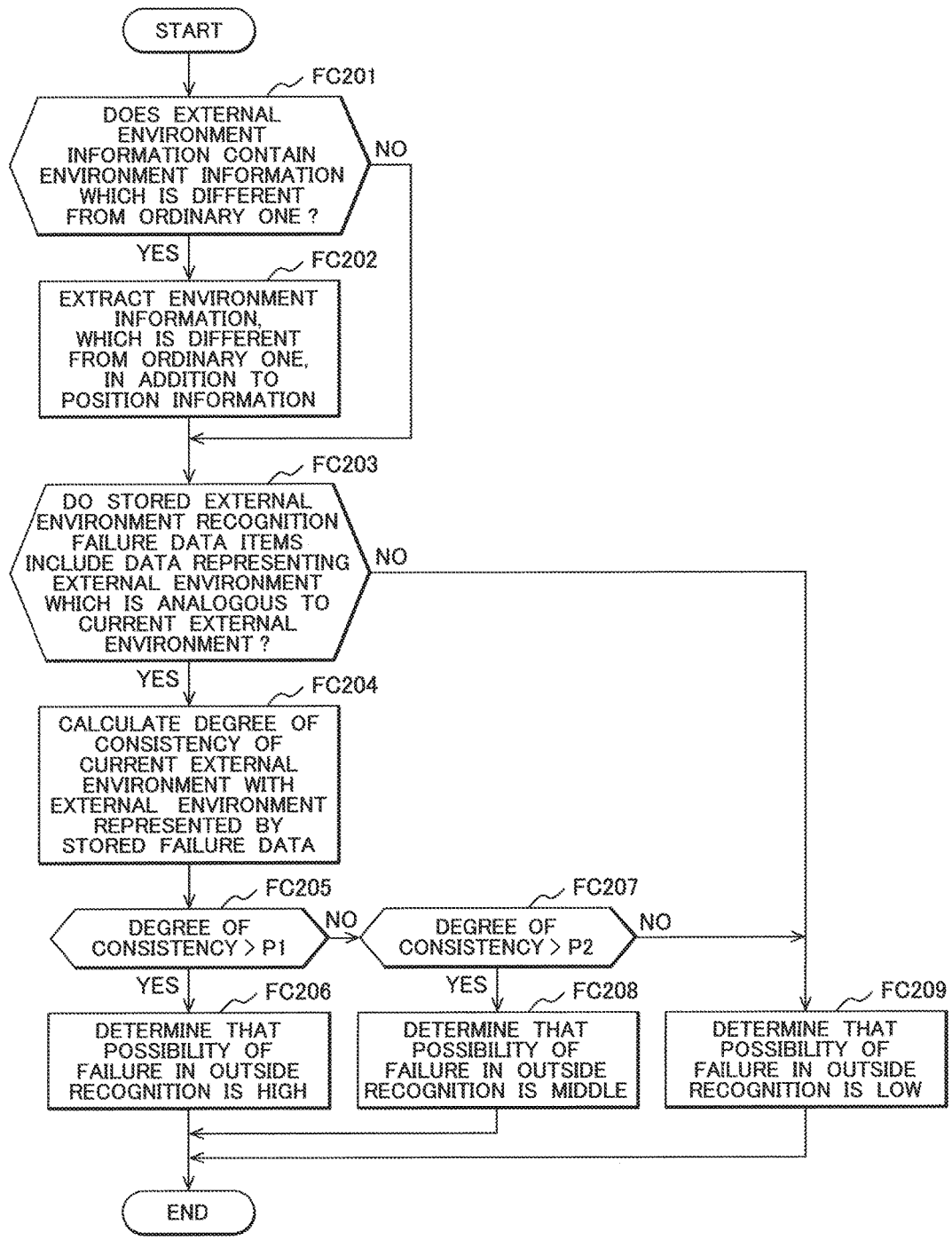
FIG. 5 is a flowchart describing an example of processing to be performed when an external environment of a vehicle is inputted to an outside recognition failure storage in the embodiment 1 of the present invention.

When a cause linked with a failure in outside recognition is inputted from the outside recognition failure cause analyzer 108, the outside recognition failure storage 109 sequentially stores the cause. If the external environment of a vehicle acquired by the external environment information acquirer 107 is inputted, a failure in outside recognition is checked to see if the failure has occurred under the same condition as the inputted external environment. If the failure has occurred, a possibility of a failure in outside recognition is determined to be high. If the failure has not occurred, the possibility of a failure in outside recognition is determined to be low. FIG. 5 is a flowchart describing an example of processing which the outside recognition failure storage 109 performs in response to input of the external environment of the vehicle.

At FC201, external environment information on a vehicle is checked to see if the information contains environment information different from ordinary one. If the environment information is contained, processing proceeds to FC202. If the environment information is not contained, the processing proceeds to FC203.

At FC202, the environment information different from ordinary one is extracted in addition to position information.

At FC203, stored external environment recognition failure data items are checked to see if the data items include data representing a current external environment or an external environment analogous to the extracted current external environment. If the data is included, the processing proceeds to FC204.

At FC204, a degree of consistency of the current external environment with an external environment represented by stored failure data is calculated. Herein, the degree of consistency is, for example, defined as follows:

degree of consistency=the number of pieces of external environment information which are represented by stored failure data items and are consistent with a current external environment/the number of external environments represented by all the stored failure data items For example, assuming that position information and information "tunnel" are recorded as an external environment represented by stored failure data, if a current external environment is a tunnel but the tunnel is located at a different place, the position information is different. Therefore, a degree of consistency is 0.5. As for the position information, if a difference falls within about 20 m, a position represented by the position information is regarded as being consistent with an actual one.

At FC205, a degree of consistency is compared with a predefined threshold P1. If the degree of consistency is larger than P1, it is determined at FC206 that a possibility of a failure in outside recognition is high.

At FC205, if the degree of consistency is equal to or smaller than P1, the degree of consistency is compared with a predefined threshold P2 that is smaller than P1. If the degree of consistency is larger than P2, it is determined at FC208 that a possibility of a failure in outside recognition is middle.

At FC207, if the degree of consistency is equal to or smaller than P1 or if stored external environment recognition failure data items are found at FC203 not to include data representing an external environment analogous to a current external environment, it is determined at FC209 that a possibility of a failure in outside recognition is low.

According to the foregoing processing flow, a possibility of a failure in outside recognition can be checked based on current external environment information on a vehicle. In FIG. 5, the degree of consistency is classified into three ranks. If necessary, the degree of consistency may be classified into two ranks or finely classified into ranks more than three ranks.

The provision information producer 110 produces check information on a possibility of a failure in outside recognition of a vehicle which has been checked in response to input of external environment information on a connected car, which is acquired by the external environment information acquirer 107, to the outside recognition failure storage 109. The check information is notified by the notifier of the vehicle via the network N. The contents of notification vary depending on the check information. For example, if the possibility of a failure in recognition is high, "Make ready for manual drive." is notified. If the possibility of a failure in recognition is middle, "Be careful of driving ahead." is notified.

According to the present embodiment, a failure in outside recognition is stored while being linked with external environment information. Thus, a possibility of a failure in outside recognition can be checked for an external environment under the same condition as the condition under which a failure in outside recognition has occurred previously. A vehicle concerned is notified of check information, whereby the vehicle can be attracted attention for a failure in outside recognition.

Embodiment 2

Figure 6:
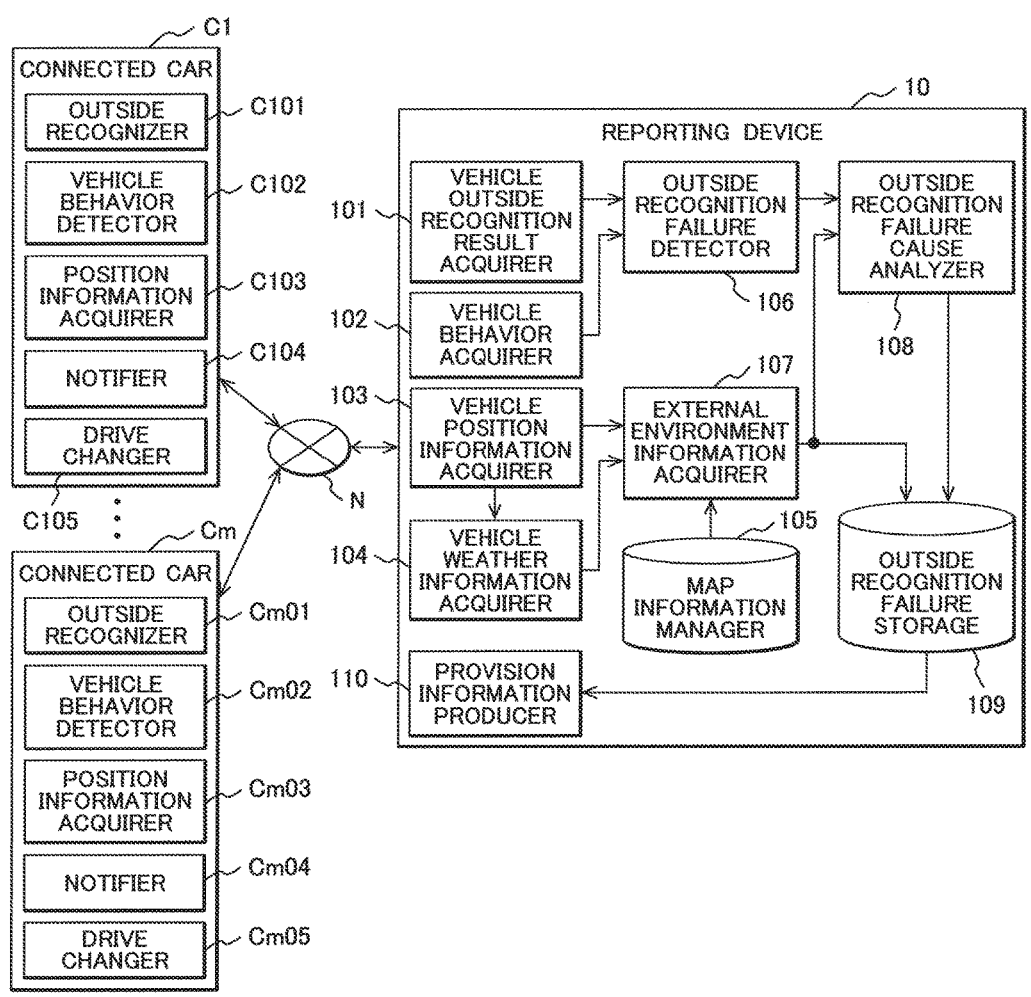
FIG. 6 is a diagram showing a configuration of a reporting device in accordance with an embodiment 2 of the present invention.

According to the present embodiment, a connected car is notified of a possibility of a failure in outside recognition in the same manner as it is in the embodiment 1. In addition, while there is the possibility of a failure in outside recognition, an autonomous drive or a drive assist of the connected car is suspended and the autonomous drive is changed to a manual drive. FIG. 6 is a diagram showing a configuration of a reporting device 10 in accordance with the present embodiment. A difference from FIG. 1 lies in a point that each of the connected cars (C1 to Cm) includes a drive changer.

Figure 7:
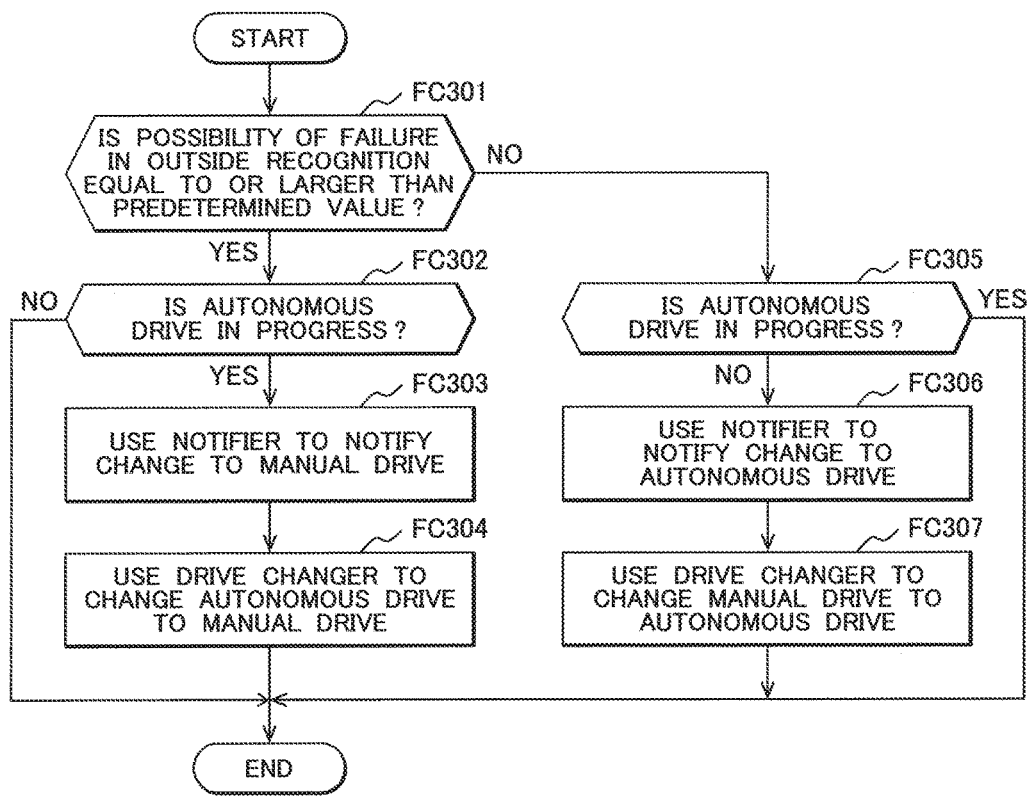
FIG. 7 is a flowchart describing actions of a notifier and a drive changer of a connected car in the embodiment 2 of the present invention.

FIG. 7 is a flowchart describing actions of a notifier and the drive changer of a connected car in the present embodiment. The processing is periodically performed.

At FC301, a possibility of a failure in outside recognition is checked to see if the possibility is equal to or larger than a predetermined criterial value. If the possibility is equal to or larger than the criterial value, the processing proceeds to FC302. If the possibility falls below the criterial value, the processing proceeds to FC305.

At FC302, whether the autonomous drive is in progress is determined. If it is determined at FC302 that the autonomous drive is in progress, the notifier is used to notify a change to the manual drive at FC303. At FC304, the drive changer is used to change the autonomous drive to the manual drive. The processing is then terminated. In contrast, if it is determined at FC302 that the manual drive is in progress, since it is unnecessary to change the autonomous drive to the manual drive, the processing is terminated.

At FC305, similarly to FC302, whether the autonomous drive is in progress is determined. If it is determined at FC305 that the manual drive is in progress, the notifier is used to notify a change to the autonomous drive at FC306. At FC307, the drive changer is used to change the manual drive to the autonomous drive. The processing is then terminated. In contract, if it is determined at FC305 that the autonomous drive is in progress, since it is unnecessary to change the manual drive to the autonomous drive, the processing is terminated.

According to the present embodiment, based on a check on a possibility of a failure in outside recognition performed by the reporting device, the autonomous drive and the manual drive can be changed.

FIG. 7 describes that a change to the manual drive is made when a possibility of a failure in outside recognition is equal to or larger than a predetermined value. Alternatively, position information on a vehicle may be used or predicted based on navigation information on the vehicle, and the possibility of a failure in outside recognition may be checked for a time point that succeeds to a current time. Thus, the autonomous drive may be changed to the manual drive on an early stage.

Furthermore, navigation information may be produced based on a history of failures in outside recognition stored in the outside recognition failure storage 109 in the reporting device 10. Accordingly, for example, the navigation information may be produced only for a route along which a possibility of a failure in outside recognition is low.

Embodiment 3

Figure 8:
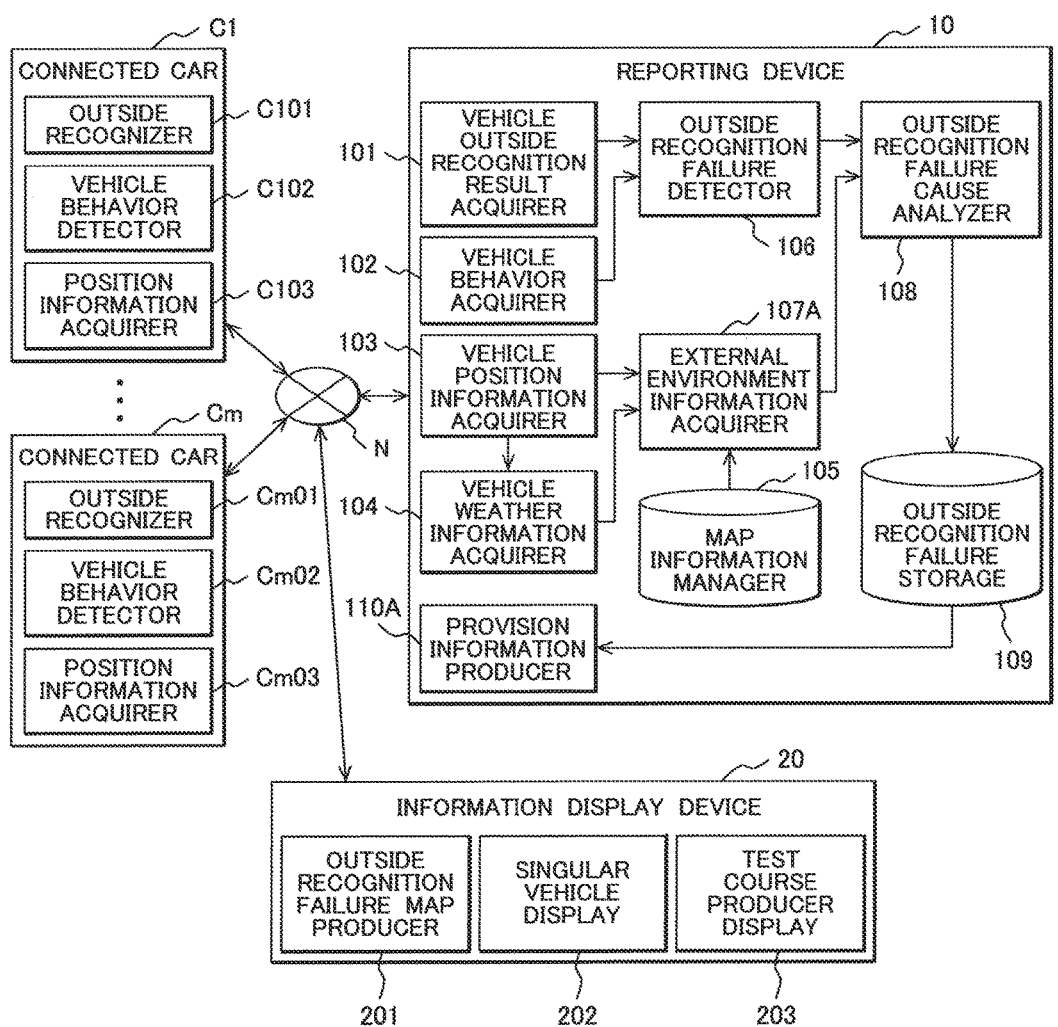
FIG. 8 is a diagram showing a configuration of a reporting device in accordance with an embodiment 3 of the present invention.

According to the present embodiment, the notifier of a connected car is not, unlike that in the embodiment 1, notified of information stored in the outside recognition failure storage, but an information display device 20 is provided with the information via the network N. FIG. 8 is a diagram showing a configuration of a reporting device 10 in accordance with the present embodiment. A difference from FIG. 1 lies in a point that each of the connected cars (C1 to Cm) does not include the notifier, a point that external environment information acquired by the external environment information acquirer 107 is not inputted to the outside recognition failure storage 109 (107A for discrimination from FIG. 1), a point that information to be produced by the provision information producer 110 is different (110A for discrimination from FIG. 1), and a point that information produced by the provision information producer is displayed on the information display device 20 via the network N.

The provision information producer 110A produces statistical information on failures in outside recognition of a connected car which are stored in the outside recognition failure storage 109. The statistical information contains, for example, the number of occurrences of a failure in outside recognition under the same condition. Although a majority of connected cars fails in outside recognition under a specific condition of an external environment, if a certain vehicle does not fail in outside recognition, the provision information producer 110A outputs information on the vehicle.

The information display device 20 includes an outside recognition failure map producer 201, a singular vehicle display 202, and a test course producer display 203.

Figure 9:
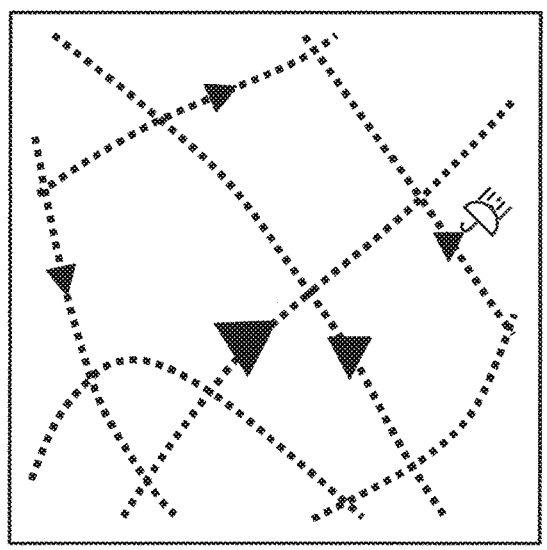
FIG. 9 is a diagram showing an example of an outside recognition failure map in the embodiment 3 of the present invention.

The outside recognition failure map producer 201 produces an occurrence map of failures in outside recognition on the basis of statistical information on the failures in outside recognition. FIG. 9 is a diagram showing an example of an outside recognition failure map. A black boldfaced dotted line indicates a road, a triangle mark facing downward indicates a place where a failure in outside recognition has occurred, and the size of the triangle mark indicates an occurrence frequency. An umbrella mark signifies that a failure in outside recognition has occurred at the time of a torrential rain. Thus, owing to the outside recognition failure map producer 201, places where the respective failures in outside recognition have occurred can be graphically checked together with the causes.

The singular vehicle display 202 displays information on a vehicle, which does not fail in outside recognition under the circumstances that a majority of connected cars fails in outside recognition, produced by the provision information producer 110A. Thus, a result of outside recognition of the vehicle can be checked to see if it actually signifies that the outside recognition proves to be abnormal, or detection of a failure in outside recognition can be checked for an error.

Figure 10:
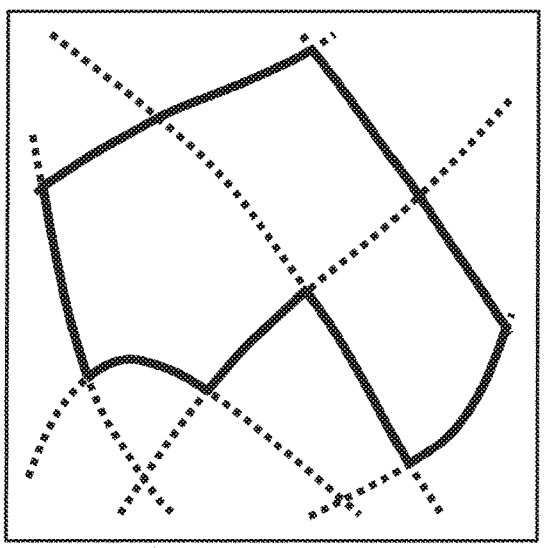
FIG. 10 is an example of a test course produced by a test course producer display in the embodiment 3 of the present invention.

The test course producer display 203 creates a test course on the basis of statistical information on failures in outside recognition. FIG. 10 is a diagram showing an example of a test course produced by the test course producer display 203. In the drawing, a black boldfaced dotted line indicates a road, and a black boldfaced solid line indicates a test course. The test course is produced to cover places in the outside recognition failure map shown in FIG. 9 where respective failures in outside recognition have occurred. When an outside recognizer is tested based on the produced test course, parameters for outside recognition can be easily adjusted and a time required for test traveling can be shortened.

REFERENCE SIGNS LIST

10: reporting device,
101: vehicle outside recognition result acquirer,

102: vehicle behavior acquirer,
103: vehicle position information acquirer,
104: vehicle weather information acquirer,
105: map information manager,
106: outside recognition failure detector,
107: external environment information acquirer,
108: outside recognition failure cause analyzer,
109: outside recognition failure storage,
110: provision information producer,
C1 to Cm: connected car,
C101 to Cm01: outside recognizer,
C102 to Cm02: vehicle behavior detector,
C103 to Cm03: position information acquirer,
C104 to Cm04: notifier, and
C105 to Cm05: drive changer

What is claimed is:

1. A reporting device comprising:
a vehicle outside recognition result acquirer connected to each of a plurality of vehicles via a network;
an outside recognition failure detector coupled to the vehicle outside recognition result acquirer;
an outside recognition failure cause analyzer coupled to said outside recognition failure detector and which is controlled based on information of a result of recognition determined by an outside recognizer of one of said plurality of vehicles, said information of the result of recognition being received by the vehicle outside recognition result acquirer via the network; and
an outside recognition failure storage device coupled to said outside recognition failure cause analyzer and which stores an external environment for which an outside recognition failure has occurred previously for each of said plurality of vehicles,
wherein the outside recognition failure cause analyzer is configured to determine information on a possibility of a failure in outside recognition for the plurality of vehicles on the basis of said stored external environment for which the failure in outside recognition has occurred previously.

2. The reporting device according to claim 1,
wherein a failure in outside recognition is detected based on a behavior of another of said plurality of vehicles which is a preceding vehicle with respect to said one vehicle of the plurality of vehicles, and which is traveling on a same lane with respect to said one vehicle, and a change in a relative distance of said one vehicle from said preceding vehicle.

3. The reporting device according to claim 1,
wherein a failure in outside recognition is detected based on an outcome of a brake command, which is issued from an autonomous drive or a drive assist function included in each of the plurality of vehicles, and the contents of a brake maneuver performed by a driver.

4. The reporting device according to claim 1,
wherein a failure in outside recognition is detected based on previous successes and failures in outside recognition which are preliminarily classified and learned.

5. The reporting device according to claim 1, further comprising:
an external environment acquirer configured to acquire said external environment of the plurality of vehicles,
wherein said external environment acquirer is configured to store a failure in outside recognition in association with said external environment using the outside recognition failure storage device.

6. The reporting device according to claim 5,
wherein when a degree of consistency of a current external environment of the plurality of vehicles with an external environment associated with a failure in outside recognition stored in the outside recognition failure storage is high, a possibility of a failure in outside recognition of the plurality of vehicles is determined to be high.

7. The reporting device according to claim 2, comprising:
an external environment acquirer configured to acquire said external environment of the plurality of vehicles,
wherein said external environment acquirer is configured to store a failure in outside recognition in association with said external environment using the outside recognition failure storage device.

8. The reporting device according to claim 7,
wherein when a degree of consistency of a current external environment of the plurality of vehicles with an external environment associated with a failure in outside recognition stored in the outside recognition failure storage is high, a possibility of a failure in outside recognition of the plurality of vehicles is determined to be high.

9. The reporting device according to claim 3, comprising:
an external environment acquirer configured to acquire said external environment of the plurality of vehicles,
wherein said external environment acquirer is configured to store a failure in outside recognition in association with said external environment using the outside recognition failure storage device.

10. The reporting device according to claim 9,
wherein when a degree of consistency of a current external environment of the plurality of vehicles with an external environment associated with a failure in outside recognition stored in the outside recognition failure storage is high, a possibility of a failure in outside recognition of the plurality of vehicles is determined to be high.

11. The reporting device according to claim 4, comprising:
an external environment acquirer configured to acquire said external environment of the plurality of vehicles,
wherein said external environment acquirer is configured to store a failure in outside recognition in association with said external environment using the outside recognition failure storage device.

12. The reporting device according to claim 11,
wherein when a degree of consistency of a current external environment of the plurality of vehicles with an external environment associated with a failure in outside recognition stored in the outside recognition failure storage is high, a possibility of a failure in outside recognition of the plurality of vehicles is determined to be high.

* * * * *